United States Patent
Wang et al.

(10) Patent No.: US 9,292,169 B2
(45) Date of Patent: Mar. 22, 2016

(54) METHOD AND DEVICE FOR DISPLAYING INTERFACE

(71) Applicant: Tencent Technology (Shenzhen) Company Limited, Shenzhen, Guangdong (CN)

(72) Inventors: Qilin Wang, Shenzhen (CN); Dongfu Han, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/624,505

(22) Filed: Feb. 17, 2015

(65) Prior Publication Data

US 2015/0160828 A1   Jun. 11, 2015

Related U.S. Application Data

(63) Continuation of application No. PCT/CN2013/080694, filed on Aug. 2, 2013.

(30) Foreign Application Priority Data

Aug. 17, 2012 (CN) .......................... 2012 1 0295549

(51) Int. Cl.
*G06F 3/0481* (2013.01)
*G06F 3/0482* (2013.01)
(Continued)

(52) U.S. Cl.
CPC .......... *G06F 3/04817* (2013.01); *G06F 3/0482* (2013.01); *G06F 3/04886* (2013.01); *G06F 17/30899* (2013.01); *G06F 3/0481* (2013.01);
(Continued)

(58) Field of Classification Search
CPC . G06F 3/0481; G06F 3/0482; G06F 3/04817; G06F 3/04886; G06F 3/04842; G06F 17/30899; G06F 17/30884
USPC .......................................... 715/712, 776, 841
See application file for complete search history.

(56) References Cited

U.S. PATENT DOCUMENTS 5,504,852 A * 4/1996 Thompson-Rohrlich ..... 715/835
5,644,739 A * 7/1997 Moursund ..................... 715/840
(Continued)

FOREIGN PATENT DOCUMENTS

CN   101782829   7/2010

OTHER PUBLICATIONS

International Search Report for International Application No. PCT/CN2013/080694, mailed Nov. 7, 2013, 2 pages.
(Continued)

*Primary Examiner* — Ting Lee
(74) *Attorney, Agent, or Firm* — Blakely, Sokoloff, Taylor & Zafman

(57) ABSTRACT

A method for displaying an interface is provided. The method includes displaying an icon of at least one first object in a first area of a display interface, displaying an icon of a second object in a second area of the display interface if the second object exists, the second object and the first object belong to a same level and different categories, wherein if one of the at least one first object is selected, the method further includes: hiding an icon of a first object which is not selected in the first area, displaying an icon of each sub-object of the selected first object in the second area, displaying an icon of a first object in the first area which is not selected in a third area of the display interface and displaying the icon of the second object in a fourth area of the display interface.

13 Claims, 4 Drawing Sheets

(51) Int. Cl.
*G06F 3/0488* (2013.01)
*G06F 3/0484* (2013.01)
*G06F 17/30* (2006.01)

(52) U.S. Cl.
CPC ....... *G06F 3/04842* (2013.01); *G06F 17/30884* (2013.01)

(56) References Cited

U.S. PATENT DOCUMENTS

| | | | |
|---|---|---|---|
| 6,857,104 B1 * | 2/2005 | Cahn | 715/810 |
| 7,681,141 B2 * | 3/2010 | Tu | 715/784 |
| 8,397,180 B2 * | 3/2013 | Duhig | 715/838 |
| 8,881,062 B2 * | 11/2014 | Kim et al. | 715/835 |
| 8,982,043 B2 * | 3/2015 | Liang et al. | 345/156 |
| 2010/0185986 A1 * | 7/2010 | Quintanilla et al. | 715/835 |
| 2011/0181520 A1 | 7/2011 | Boda et al. | |
| 2012/0047456 A1 * | 2/2012 | Chen et al. | 715/781 |

OTHER PUBLICATIONS

Written Opinion of the International Search Authority for PCT International Application No. PCT/CN2013/080694, mailed Nov. 7, 2013, 4 pages.

* cited by examiner

METHOD AND DEVICE FOR DISPLAYING INTERFACE

CROSS-REFERENCE TO RELATED APPLICATIONS

This application is a continuation of PCT International Application No. PCT/CN2013/080694, filed on Aug. 2, 2013, and claims priority of Chinese patent application No. 201210295549.9, filed on Aug. 17, 2012, the content of both of which are incorporated herein by reference in their entirety.

FIELD OF THE INVENTION

The present disclosure relates to an information display filed of electronic devices, and more particularly, to a method and a device for displaying an interface of a touch screen mobile device.

BACKGROUND

At present, electronic devices are equipped with a storage function. When files are stored, the user usually creates multiple folders for storing and managing the files. However, in the conventional technical scheme, when a folder of a next directory on the page of the current directory is opened, an operation of jumping to the page of the next level is performed. The page of the previous level is covered and items in the folder are processed in the new page. Obviously, the user experiences obvious scene jump in the operation process with the current display method and it is inconvenient for managing objects, such as folders in the directory with this display method.

SUMMARY

Embodiments of the present disclosure disclose a method and device for displaying an interface, by which the jump between different pages may be avoided and the objects in the tree-type structure may be effectively managed.

A method for displaying an interface includes:
displaying an icon of at least one first object in a first area of a display interface;
displaying an icon of a second object in a second area of the display interface if the second object exists, the second object and the first object belong to a same level and different categories;
wherein if one of the at least one first object is selected, the method further comprises:
hiding an icon of a first object which is not selected in the first area;
displaying an icon of a sub-object of the selected first object in the second area;
displaying an icon of a first object in the first area which is not selected in a third area of the display interface; and
displaying the icon of the second object in a fourth area of the display interface.

A device for displaying an interface includes a processor and a screen; wherein the processor is to
display an icon of at least one first object in a first area of a display interface on the screen;
display an icon of a second object in a second area of the display interface on the screen if the second object exists, the second object and the first object belong to a same level and different categories;
wherein if one of the at least one first object is selected, the processor is further to hide an icon of a first object which is not selected in the first area of the screen;
display an icon of a sub-object of the selected first object in the second area of the screen;
display an icon of a first object in the first area which is not selected in a third area of the display interface on the screen; and
display the icon of the second object in a fourth area of the display interface on the screen.

A non-transitory computer-readable medium storing instructions which, when executed by one or more processors, cause a device to perform a method for displaying an interface, the method including:
displaying an icon of at least one first object in a first area of a display interface;
displaying an icon of a second object in a second area of the display interface if the second object exists, the second object and the first object belong to a same level and different categories;
wherein if one of the at least one first object is selected, the method further comprises:
hiding an icon of a first object which is not selected in the first area;
displaying an icon of each sub-object of the selected first object in the second area;
displaying an icon of a first object in the first area which is not selected in a third area of the display interface; and
displaying the icon of the second object in a fourth area of the display interface.

In the above method and device for displaying the interface, as for the data structure of the tree-type, objects of different levels may be expanded in the same interface. Therefore, the jump between different pages may be avoided. The user may intuitively view the interface and it is convenient for the user to manage the objects of different levels.

DETAILED DESCRIPTION

In order to make objectives, technical solutions and advantages of the present disclosure more apparent, the present disclosure will be described in detail hereinafter with reference to accompanying drawings. It should be noted that the embodiments described hereinafter are only used for explaining the present disclosure, but not used for limiting the present disclosure.

Embodiments of the present disclosure disclose a method for displaying an interface. In the embodiment, the interface is a point of interaction with software, or computer hardware, or with peripheral devices such as a computer monitor or a keyboard. The method may be applied to an electronic device with a calculation function, such as a desktop computer, an intelligent mobile phone and a Tablet PC. The above electronic device may include a display element (namely the computer monitor), such as a Liquid Crystal Display (LCD) monitor for output. The above method for displaying an interface is especially suitable for graphically displaying data of tree-type structure. For example, the above data of tree-type structure may include a folder or a bookmark. Generally, the tree-type structure has two kinds of objects (nodes). One has sub-objects; the other does not have sub-object and is an end object. As for the folder, the folder may have a sub-folder and a file. As for a bookmark, the user may create folders to manage different kinds of files. The above folders and bookmarks are stored using the tree-type structure. Furthermore, the above tree-type structure may also include logical tree-type structure. For example, the logical tree-type structure refers to the tree-type structure implemented using the relationship between the storage objects in a database or an ordinary file.

Figure 1:
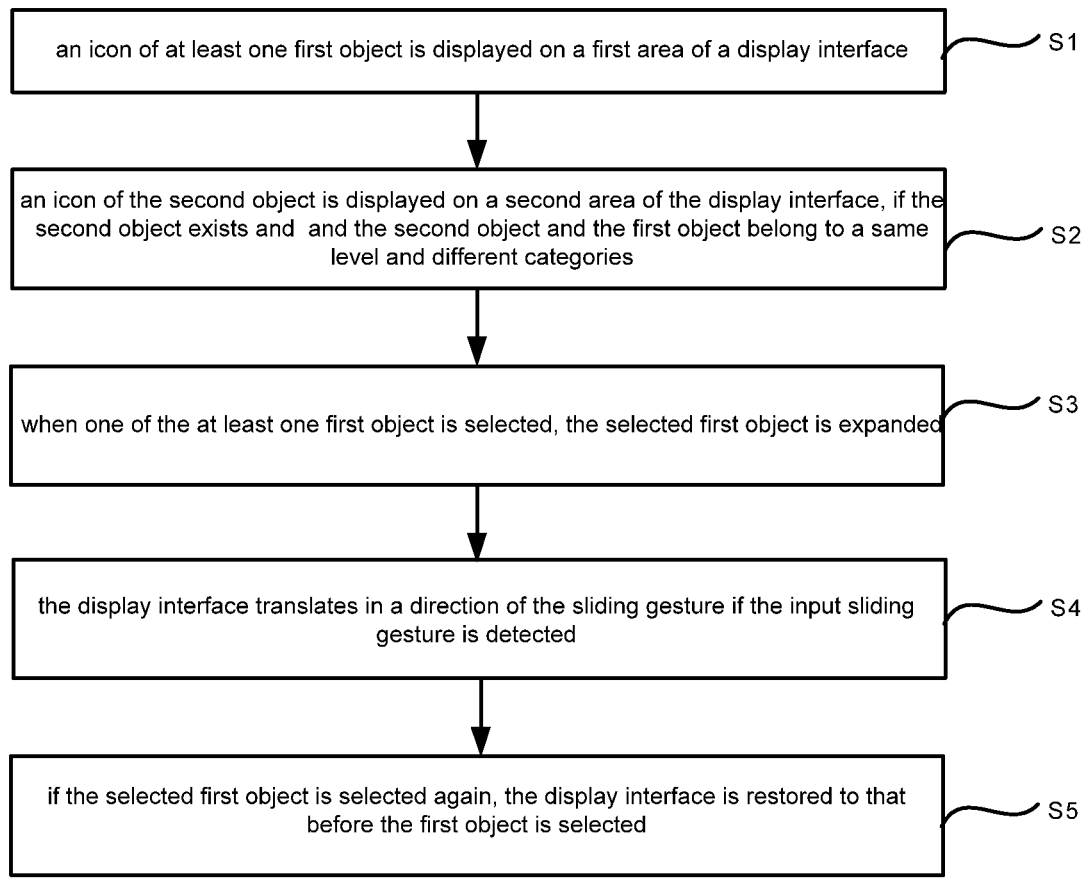
FIG. 1 is a flow chart illustrating a method for displaying an interface in accordance with a first embodiment.

FIG. 1 is a flow chart illustrating a method for displaying an interface in accordance with a first embodiment. The method is used for graphically displaying bookmarks stored by the user in the process of using a browser, such as a Chrome browser. As shown in FIG. 1, the method for displaying an interface includes the following blocks.

In block S1, an icon of at least one first object is displayed on a first area of a display interface.

If there is a second object, the second object and the first object belong to a same level and different categories, block S2 is performed.

In block S2, an icon of the second object is displayed on a second area of the display interface.

Figure 2:
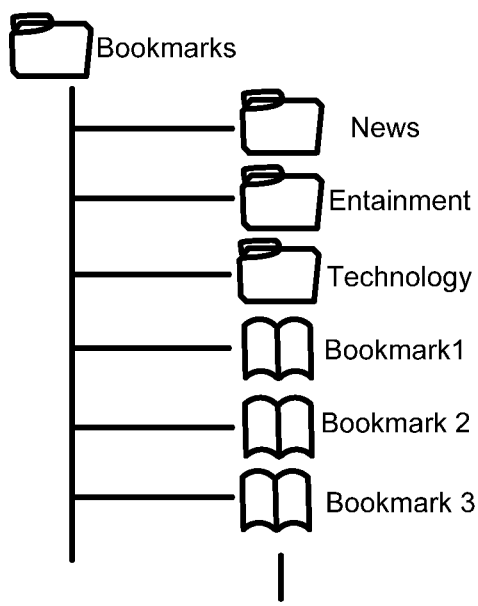
FIG. 2 is a schematic diagram illustrating a storage mode of objects in an interface.

In this embodiment, the above first object can be a folder and the second object can be a bookmark. Referring to FIG. 2, the browser is used for storing a root directory named as bookmarks. The root directory includes three sub-folders and eleven bookmarks. For example, the three sub-folders includes a sub-folder for news (hereinafter referred as "news sub-folder"), a sub-folder for entertainment (hereinafter referred as "entertainment sub-folder"), and a sub-folder for technology (hereinafter referred as "technology sub-folder"). The eleven bookmarks and the three sub-folders belong to the same level (both of them are the sub-objects of the root directory named as the bookmarks). For example, the above folders are created by the user and the bookmarks are generated by storing WebPages when the user browses WebPages.

Figure 3:
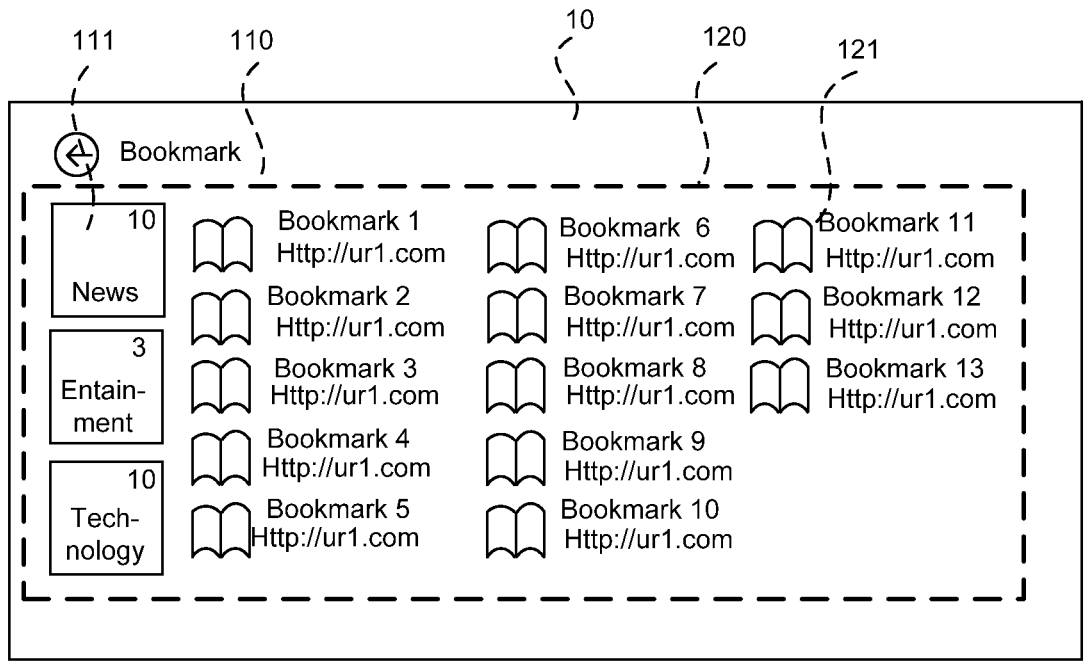
FIG. 3 is a schematic diagram illustrating an interface obtained by displaying the objects in FIG. 2 with the method in FIG. 1.

Referring to FIG. 3, FIG. 3 is a result obtained by processing the objects shown in FIG. 2 with the above blocks S1 and S2. As shown in FIG. 3, a screen 10 includes a first area 110 and a second area 120. In the first area 110, as for the news sub-folder, the entertainment sub-folder and the technology sub-folder in the root directory, each sub-folder displays a corresponding icon 111. Three icons 111 are lined up. The icon 111 may display additional information, such as the name of the sub-folder and the count number of sub-objects in the sub-folder. In the second area 120, as for the thirteen bookmarks in the root directory, a corresponding icon 121 of each of the bookmarks is displayed. Additional information, such as a Uniform Resource Locator (URL) associated with each bookmark and the title of the webpage associated with the URL is displayed in each icon 121. For example, the icon of each bookmark may be a favicon.ico corresponding to the URL.

Figure 4:
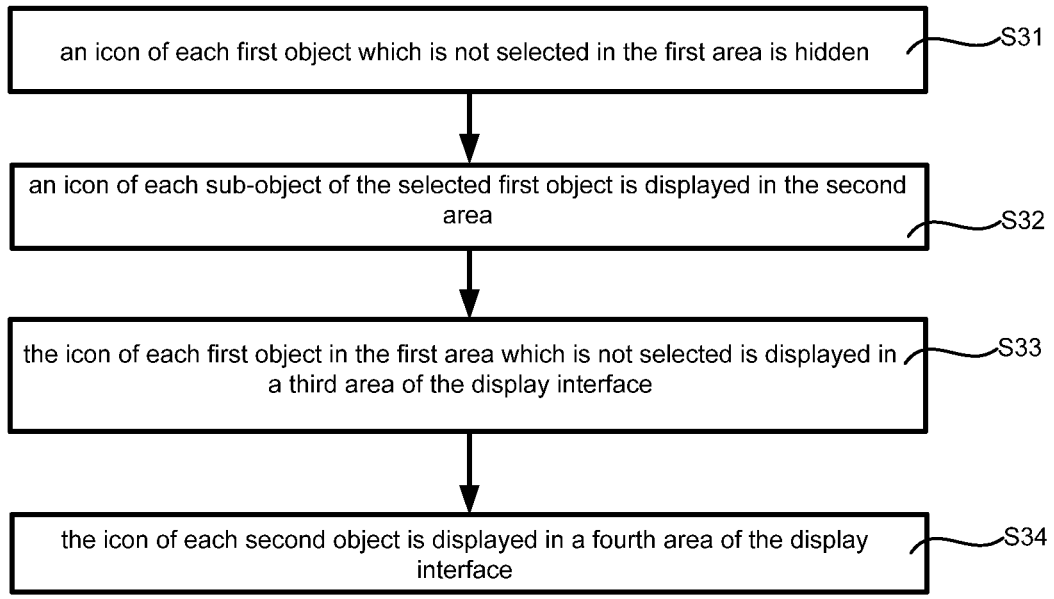
FIG. 4 is a specific flow chart illustrating partial blocks in the method for displaying an interface in FIG. 1.

When one of the at least one first object is selected, block S3 is performed. The selected first object is expanded. Referring to FIG. 4, the block S3 includes the following blocks.

In block S31, an icon of each first object which is not selected in the first area is hidden.

In block S32, an icon of a sub-object of the selected first object is displayed in the second area.

The first object may include more than one sub-object. If there is more than one sub-object, the icon of the more than one sub-object is displayed in the second area.

In block S33, the icon of each first object in the first area which is not selected is displayed in a third area of the display interface.

In block S34, the icon of each second object is displayed in a fourth area of the display interface.

Figure 5:
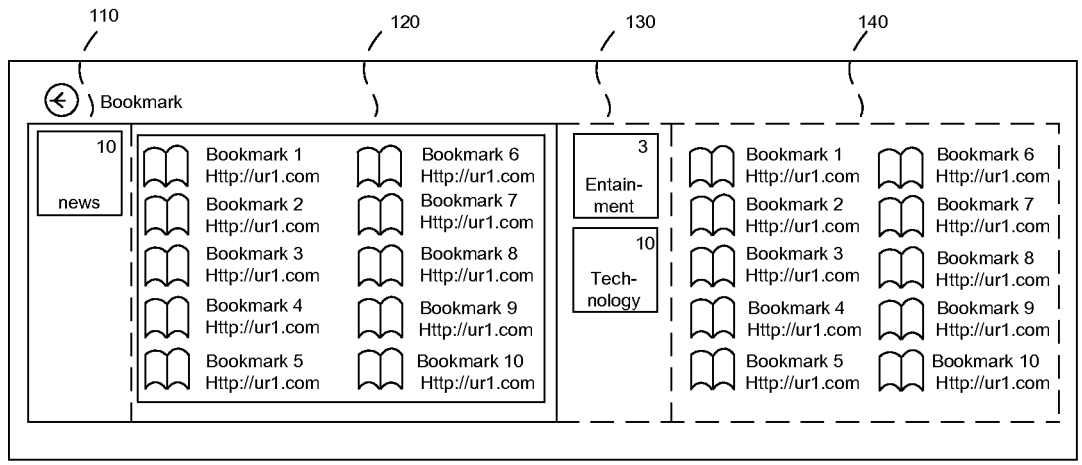
FIG. 5 is a schematic diagram illustrating an interface, in which the first object displayed with the method in FIG. 1 is expanded.

FIG. 5 is a schematic diagram illustrating an interface, in which the first object displayed with the method in FIG. 1 is expanded. Referring to FIGS. 3 and 5, the icons of the entertainment sub-folder and the technology sub-folder in the first area 110 are hidden. The icons of the bookmarks in the root directory displayed in the second area 120 are replaced with icons of the bookmarks in the news sub-folder. The icons of the entertainment sub-folder and the technology sub-folder are displayed in the third area 130 and the icons of the bookmarks in the root directory are displayed in the fourth area 140. It can be seen from FIG. 5 that the first area 110, second area 120, third area 130, and the fourth area 140 are arranged one by one from left to right.

Figure 6:
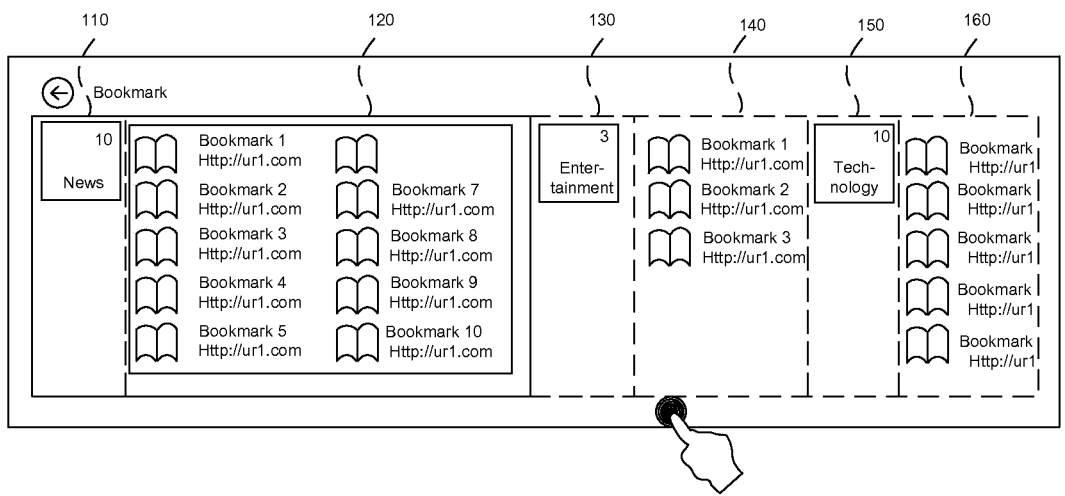
FIG. 6 is a schematic diagram illustrating an interface, in which multiple first objects displayed with the method in FIG. 1 are expanded.

It can be understood that as for the icons of the sub-folders displayed in the third area 130, the above blocks S1 to S3 may be executed repeatedly. Therefore, as shown in FIG. 6, the icon of the technology sub-folder is hidden in the third area 130 and the icons of the sub-objects of the entertainment sub-folder are displayed in the fourth area 140. Accordingly, the icon of the technology sub-folder and the icons of the bookmarks in the root directory are respectively displayed in a fifth area 150 and a sixth area 160. That is, no matter how many sub-folders are included in the root directory, the sub-folders may be expanded in turn.

It can be understood that after the multiple sub-folders are expanded, the sum of the width of each area (includes the above first area 110, the second area 120, the third area 130, the fourth area 140, the fifth area 150, and the sixth area 160) may exceed that of the display interface. As shown in FIG. 6, the display interface formed by the above areas may be translated via left and right sliding gestures. Furthermore, the method in the embodiment may further include block S4. In block S4, the display interface translates in a direction of the sliding gesture if the input sliding gesture is detected.

Furthermore, the method for displaying the interface in the embodiment may further include block S5. In block S5, if the selected first object is selected again, the display interface is restored to that before the first object is selected. Specifically, in the status shown in FIG. 5, if the news sub-folder is selected again, the display interface is restored to the status shown in FIG. 3. That is, the news sub-folder, the entertainment sub-folder and the technology sub-folder are displayed in the first area 110 and the icons in the second area 120 are replaced with the icons of the bookmarks in the root directory. In the above embodiments, the expansion of one-layer sub-folder is described. However, it can be understood that the above expansion method may be applied to the multiple-layer sub-folders. For instance, if the news sub-folder has a sub-folder and the sub-folder of the news sub-folder is selected, the third area 130 and the fourth area 140 are translated to the right and the area between the second area 120 and the third area 130 are used for displaying the icon of the selected sub-folder and icons of sub-objects in the selected sub-folder. The specific display process may refer to the displaying process of the first area 110 and the second area 120. Furthermore, the area for displaying the icon of the selected sub-folder and the icons of the sub-objects in the selected sub-folder is not limited to that between the second area 120 and the third area 130, instead may be any suitable location of the display interface.

Furthermore, although the method for displaying an interface in the embodiment includes block S4 and block S5, block S4 and block S5 are not necessary. In some circumstances, only the selected first object is expanded.

In the method for displaying an interface shown in the above embodiments, as for the data structure of the tree-type, objects of different levels may be expanded in the same interface. Therefore, the jump between different pages may be avoided. The user may intuitively view the interface and it is convenient for the user to manage the objects of different levels.

Figure 7:
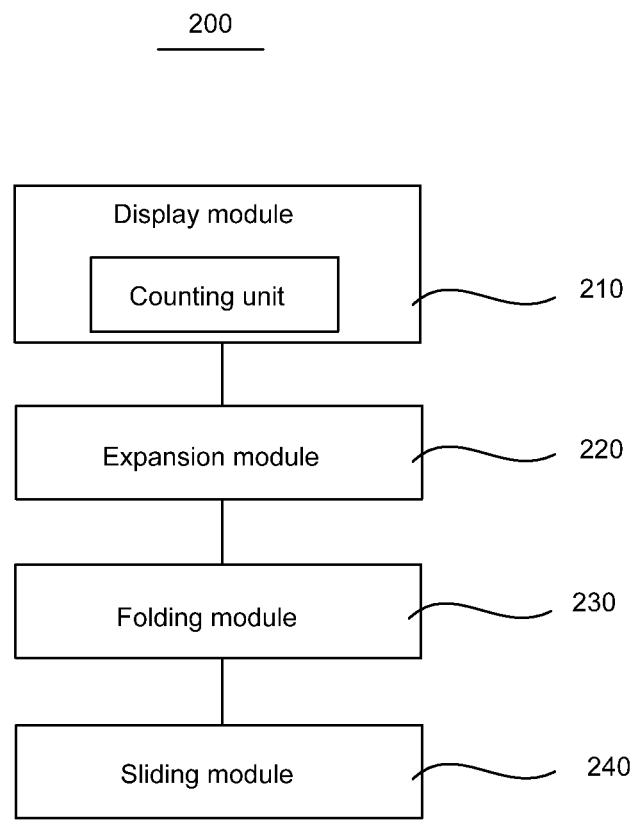
FIG. 7 is a schematic diagram illustrating structure of a device for displaying an interface in accordance with a second embodiment of the present disclosure.

FIG. 7 is a schematic diagram illustrating structure of a device for displaying an interface in accordance with a second embodiment of the present disclosure. As shown in FIG. 7, the device for displaying an interface 200 includes a display module 210 and an expansion module 220.

The display module 210 is to display an icon of at least one first object in a first area of a display interface and display an icon of a second object in a second area of the display interface, if the second object exists, and the second object and the first object belong to a same level and different categories. The display module 210 may include a counting unit 211 to display a count number of sub-objects of the first object on the icon of the first object.

The expansion module 220 is to hide an icon of a first object which is not selected in the first area if one of the at least one first object is selected, display an icon of each sub-object of the selected first object in the second area, display an icon of a first object in the first area which is not selected in a third area of the display interface and display the icon of the second object in a fourth area of the display interface.

The device for displaying the interface 200 further includes a folding module 230, to restore the display interface to the display interface before the selected first object is selected if the selected first object is selected again. The folding module 230 is further to hide the third area, display the icon of the first object which is not selected in the first area and display the icon of the second object in the second area.

The device for displaying the interface 200 further includes a sliding module 240, to translate the display interface in a direction of a sliding gesture according to the input sliding gesture. The first area, second area, third area, and fourth area are arranged from left to right.

Refer to the description of FIGS. 1 to 6 for other detailed features of the device for displaying the interface 200.

Figure 8:
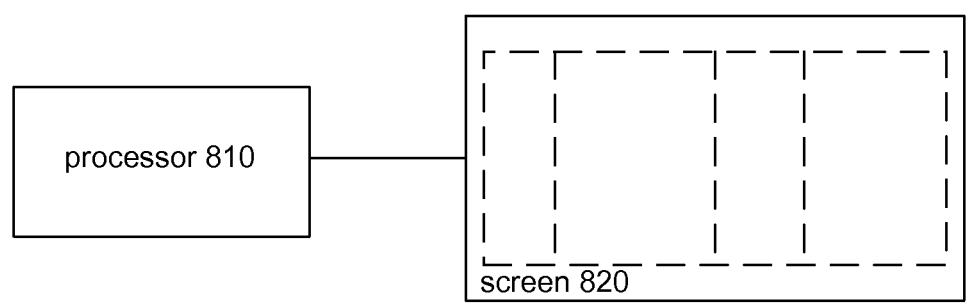
FIG. 8 is a schematic diagram illustrating another structure of a device for displaying an interface in accordance with a second embodiment of the present disclosure.

FIG. 8 is a schematic diagram illustrating another structure of a device for displaying an interface in accordance with a second embodiment of the present disclosure. As shown in FIG. 8, the device includes a processor 810 and a screen 820.

The processor 810 is to display an icon of at least one first object in a first area of a display interface on the screen 820, display an icon of a second object in a second area of the display interface on the screen 820 if the second object exists and the second object and the first object belong to a same level and different categories.

If one of the at least one first object is selected, the processor 810 is further to hide an icon of a first object which is not selected in the first area of the screen 820, display an icon of each sub-object of the selected first object in the second area of the screen 820, display an icon of a first object in the first area which is not selected in a third area of the display interface on the screen 820 and display the icon of the second object in a fourth area of the display interface on the screen 820.

The processor 810 is further to restore the display interface on the screen 820 to the display interface before the selected first object is selected if the selected first object is selected again.

The processor 810 is further to hide the third area of the screen, display the icon of the first object which is not selected in the first area of the screen 820 and display the icon of the second object in the second area of the screen 820.

The processor 810 is further to display counter number of sub-objects of the first object on the icon of the first object.

The first area, second area, third area and fourth area are arranged from left to right.

The processor 810 is further to translate the display interface on the screen 820 in a direction of a sliding gesture according to the input sliding gesture.

In the device for displaying the interface in this embodiment, as for the data structure of the tree-type, objects of different levels may be expanded in the same interface. Therefore, the jump between different pages may be avoided. The user may intuitively view the interface and it is convenient for the user to manage the objects of different levels.

Furthermore, an example of the present disclosure further provides a readable storage medium. The readable storage medium stores computer program codes, such as computer-executable instructions. The computer program codes are executed to execute the steps in the above methods. For instance, the readable storage medium may be a nonvolatile memory, such as a CD-ROM, hard disk or flash memory. The above readable storage medium enables a computer or a similar calculation device to implement the above operations of the method for displaying the interface in the above embodiment.

The foregoing only describes preferred embodiments of the present invention. The protection scope of the present invention, however, is not limited to the above description. Any change or substitution, easily occurring to those skilled in the art, should be covered by the protection scope of the present invention.

What is claimed is:

1. A method for displaying an interface, comprising:
   displaying an icon of at least one first object in a first area of a display interface;
   displaying an icon of a second object in a second area of the display interface, the second object and the first object belong to a same level and different categories;
   wherein one of the at least one first object is selected, the method further comprises:
   hiding an icon of a first object which is not selected in the first area;
   displaying an icon of each sub-object of the selected first object in the second area;
   displaying an icon of a first object in the first area which is not selected in a third area of the display interface; and
   displaying the icon of the second object in a fourth area of the display interface,
   and wherein the first area, second area, third area and fourth area are displayed together on the interface simultaneously.

2. The method for displaying the interface according to claim 1, further comprising:
   restoring the display interface to the display interface before the selected first object is selected if the selected first object is selected again.

3. The method for displaying the interface according to claim 2, wherein restoring the display interface to the display interface before the selected first object is selected comprises:
   hiding the third area;
   displaying the icon of the first object which is not selected in the first area; and
   displaying the icon of the second object in the second area.

4. The method for displaying the interface according to claim 1, wherein the first area, second area, third area, and fourth area are arranged from left to right.

5. The method for displaying the interface according to claim 4, further comprising:
   translating the display interface in a direction of a sliding gesture if the input sliding gesture is detected.

6. The method for displaying the interface according to claim 1, wherein a count number of sub-objects of the first object is displayed on the icon of the first object.

7. A device for displaying an interface, comprising a processor and a screen; wherein the processor is configured to:
   display an icon of at least one first object in a first area of a display interface on the screen;
   display an icon of a second object in a second area of the display interface on the screen, the second object and the first object belong to a same level and different categories;
   wherein one of the at least one first object is selected, the processor is further configured to:
   hide an icon of a first object which is not selected in the first area of the screen;
   display an icon of each sub-object of the selected first object in the second area of the screen;
   display an icon of a first object in the first area which is not selected in a third area of the display interface on the screen; and
   display the icon of the second object in a fourth area of the display interface on the screen,
   and wherein the first area, second area, third area and fourth area are displayed together on the interface simultaneously.

8. The device for displaying the interface according to claim 7, wherein the processor is further to
   restore the display interface on the screen to the display interface before the selected first object is selected if the selected first object is selected again.

9. The device for displaying the interface according to claim 8, wherein the processor is further to
   hide the third area of the screen;
   display the icon of the first object which is not selected in the first area of the screen; and
   display the icon of the second object in the second area of the screen.

10. The device for displaying the interface according to claim 7, wherein the processor is further to
    display a count number of sub-objects of the first object on the icon of the first object.

11. The device for displaying the interface according to claim 7, wherein the first area, second area, third area and fourth area are arranged from left to right.

12. The device for displaying the interface according to claim 7, wherein the processor is further to
    translate the display interface on the screen in a direction of a sliding gesture according to the input sliding gesture.

13. A non-transitory computer-readable medium storing instructions which, when executed by one or more processors, cause a device to perform a method for displaying an interface, the method comprising:
    displaying an icon of at least one first object in a first area of a display interface;
    displaying an icon of a second object in a second area of the display interface, the second object and the first object belong to a same level and different categories;
    wherein one of the at least one first object is selected, the method further comprises:
    hiding an icon of a first object which is not selected in the first area;
    displaying an icon of each sub-object of the selected first object in the second area;
    displaying an icon of a first object in the first area which is not selected in a third area of the display interface; and
    displaying the icon of the second object in a fourth area of the display interface,
    and wherein the first area, second area, third area and fourth area are displayed together on the interface simultaneously.

* * * * *